(12) United States Patent
Urbach

(10) Patent No.: US 10,162,491 B2
(45) Date of Patent: Dec. 25, 2018

(54) DRAG AND DROP OF OBJECTS BETWEEN APPLICATIONS

(75) Inventor: Julian Michael Urbach, Sherman Oaks, CA (US)

(73) Assignee: OTOY INC., Los Angeles, CA (US)

( * ) Notice: Subject to any disclaimer, the term of this patent is extended or adjusted under 35 U.S.C. 154(b) by 718 days.

(21) Appl. No.: 13/571,182

(22) Filed: Aug. 9, 2012

(65) Prior Publication Data

US 2013/0042259 A1    Feb. 14, 2013

Related U.S. Application Data

(60) Provisional application No. 61/523,142, filed on Aug. 12, 2011.

(51) Int. Cl.
*G06F 3/14* (2006.01)
*G06F 3/0484* (2013.01)
*G06F 3/0486* (2013.01)
*G06T 19/00* (2011.01)

(52) U.S. Cl.
CPC ........ *G06F 3/04842* (2013.01); *G06F 3/0486* (2013.01); *G06T 19/00* (2013.01)

(58) Field of Classification Search
None
See application file for complete search history.

(56) References Cited

U.S. PATENT DOCUMENTS

| 5,268,677 | A | 12/1993 | Frasier et al. |
| 5,734,808 | A | 3/1998 | Takeda |
| 6,285,363 | B1 | 9/2001 | Mairs et al. |
| 6,654,784 | B1 | 11/2003 | Wei |
| 6,697,088 | B1 | 2/2004 | Hollander |
| 6,734,873 | B1 | 5/2004 | Herf et al. |
| 6,968,507 | B2 | 11/2005 | Pennell et al. |
| 7,107,548 | B2 | 9/2006 | Shafron |

(Continued)

FOREIGN PATENT DOCUMENTS

| CN | 1896943 | 1/2007 |
| JP | H9-507322 | 7/1997 |

(Continued)

OTHER PUBLICATIONS

Ray Tracing https://web.archive.org/web/20010818132113/http://www.siggraph.org/education/materials/HyperGraph/raytrace/rtrace0.htm , G. Scott Owen, Jul. 24, 2001.*

(Continued)

*Primary Examiner* — Jennifer N To
*Assistant Examiner* — Beau D Spratt
(74) *Attorney, Agent, or Firm* — James J. DeCarlo; Greenberg Traurig, LLP

(57) ABSTRACT

Methods, apparatuses and systems directed to capturing an object rendered on the first window of a display by a first program, extracting the object, permitting a user to drag the object across the display into a second window of the display containing a second program, and importing the object into the second program in substantially real-time. The drag and drop process occurs seamlessly to the user and permits a user to select one or more of a plurality of objects in one application, drag the object into a second application for modification, and drag the modified object back into the first application for real-time preview.

18 Claims, 10 Drawing Sheets

(56) References Cited

U.S. PATENT DOCUMENTS

| | | | |
|---|---|---|---|
| 7,142,226 B2 | 11/2006 | Sakuta et al. | |
| 7,170,526 B1 | 1/2007 | Johnson | |
| 7,950,026 B1 | 5/2011 | Urbach | |
| 8,701,030 B2* | 4/2014 | Lyons et al. | 715/769 |
| 8,739,120 B2* | 5/2014 | Moody et al. | 717/113 |
| 2002/0049852 A1 | 4/2002 | Lee et al. | |
| 2004/0027398 A1* | 2/2004 | Jaeger | G06F 3/0481 715/863 |
| 2005/0081161 A1 | 4/2005 | Maccinnes et al. | |
| 2005/0223100 A1 | 10/2005 | Chen et al. | |
| 2005/0237330 A1* | 10/2005 | Stauffer | G06F 9/5016 345/531 |
| 2007/0003307 A1 | 1/2007 | Maheshwari | |
| 2007/0211065 A1* | 9/2007 | Feth et al. | 345/522 |
| 2007/0291000 A1 | 12/2007 | Liang et al. | |
| 2009/0106680 A1 | 4/2009 | Brownholtz et al. | |
| 2010/0257482 A1 | 10/2010 | Lyons et al. | |
| 2011/0018884 A1 | 1/2011 | Ritts et al. | |
| 2011/0078532 A1* | 3/2011 | Vonog | G06F 3/1454 714/752 |
| 2011/0157196 A1* | 6/2011 | Nave | G06F 9/4445 345/522 |
| 2011/0246904 A1* | 10/2011 | Pinto | G06F 9/452 715/740 |
| 2011/0276699 A1* | 11/2011 | Pedersen | H04L 45/24 709/227 |
| 2012/0146996 A1 | 6/2012 | Kamiyama et al. | |
| 2012/0293510 A1 | 11/2012 | Kamiyama et al. | |

FOREIGN PATENT DOCUMENTS

| | | |
|---|---|---|
| JP | 2002-189544 | 7/2002 |
| JP | 2004-126679 | 4/2004 |
| JP | 2004-259260 A | 9/2004 |
| TW | 201104494 | 2/2011 |
| WO | WO 9518406 | 7/1995 |
| WO | WO 2004029788 | 4/2004 |
| WO | WO 2010123048 | 10/2010 |
| WO | 2011032152 A1 | 3/2011 |

OTHER PUBLICATIONS

Drag and drop your models with Creator https://web.archive.org/web/20120101015457/http://sketchupdate.blogspot.com/2009/05/drag-and-drop-your-models-with-creator.html, Steve Dapkus, Jul. 1, 2009.*

Pick-and Drop: A Direct Manipulation Technique for Multiple Computer Enviornments https://web.archive.org/web/20110814155448/http://www.sonycsl.co.jp/person/rekimoto/pickdrop/uist97.html , Jun Rekimoto, Aug. 14, 2011.*

"AppBank Sling Note", 2010, Toshism.*

Sling Note Multi-Tasker App for iPad ,2011, Ozks.*

International Search Report (PCT/US2012/050381) dated Feb. 28, 2013; 3 pages.

Robert W. Scheifler, Jim Gettys, "The X Window System, ACM Transactions on Graphcics", vol. 5, Issue 2 (Apr. 1986); pp. 79-109.

Maarten van Dantzich, Vadim Gorokhovsky, George Robertson, Application redirection: hosting Windows applications in 3D, New Paradigms in Information Visualization and Manipulation: Proceedings of the 1999 Workshop on new paradigms in information visualization and manipulation, Nov. 2-6, 1999, pp. 87-91.

RealVNC: VNC Server Free Edition for Windows; 10 pages; archived Mar. 3, 2005; http://web.archive.org/web/20050306030412/http://www.realvnc.com/products/free/4.1/winvnc.html.

Gallagher, Computer Visualization, CRC Press, 1995, pp. 122-126.

Supplementary European Search Report (EP 12 82 4440) dated Jul. 6, 2015; 2 pages.

Official Action to corresponding Canadian Application No. 2,844,451 dated Jun. 12, 2017 (6 pages).

* cited by examiner

DRAG AND DROP OF OBJECTS BETWEEN APPLICATIONS

CROSS REFERENCE TO RELATED APPLICATIONS

This application is non-provisional application of U.S. Provisional Application No. 61/523,142, filed on Aug. 12, 2011, entitled "DRAG AND DROP OF OBJECTS BETWEEN APPLICATIONS," the entirety of which is being incorporated herein by reference.

The present disclosure generally relates to exporting and importing a three-dimensional graphic object from a first application to a second application in real-time, and more specifically the graphical representation on a user's display of the export/import process between windows rendering the first and second applications.

BACKGROUND

Graphics programs, in general, render 2D or 3D objects by converting those objects into draw commands, which are then fed into a graphics API, such as OPENGL or DIRECT3D. Within the API rendering pipeline, the draw commands undergo various processes such as hidden surface removal, Z-buffering, rasterization, and clipping before it is output as a 2D image on the application user's display. Generally exporting a particular 3D object from a graphics program, if possible, is an arduous process, requiring decompiling of the program data to retrieve an OBJ file or other readable 3D format. Similarly, importing a file into a 3D graphics program requires compiling the 3D object into the required format of the graphics program, and often requires repackaging an entire 3D object library for successful object importation.

SUMMARY

The present disclosure generally relates to exporting an object from a first 3D program for rendering in a second 3D program in real-time. In one embodiment, a computer system hosts a plurality of application instances, each application instance corresponding to a local client application. The computer system concurrently renders, utilizing the resources of the graphics processing unit of the computer system, the graphical output of the application instances corresponding to the at least two of the local client applications in separate windows on the computer system display. A user seeking to export a 3D object from the first application selects an object from the first window and drags the object to the second window. As the user drags the object, it is rendered on the computer display pursuant to the user's drag commands. The user then drops the object in the second application rendered in the second window, and the object is imported in real-time into the second application.

In one embodiment, a first computer system hosts a first application locally and the second application is hosted on an application server. The computer system renders both the local application and the remote application through its local hardware and rendering API in two separate windows on the computer system display. A user seeking to export a 3D object from the first application selects an object from the first window and drags the object to the second window. As the user drags the object, it is rendered on the computer display pursuant to the user's drag commands. The user then drops the object in the second application rendered in the second window, and the object is imported in real-time into the second application.

In one embodiment, a first computer system hosts a first application locally and the second application is hosted on an application server with server-side rendering. The computer system renders the local application using its own graphics processor and graphics API, and the remote application is rendered by a server-side graphics API. A user seeking to export a 3D object from the first application selects an object from the first window and drags the object to the second window. As the user drags the object, it is rendered on the computer display pursuant to the user's drag commands. The user then drops the object in the second application rendered in the second window, and the object is imported in real-time into the second application.

In one embodiment a method for importing an object into a second application is disclosed. The method comprises receiving, by a processor, a first user input and responsive to the first user input, selecting, by the processor, an object rendered in a first window of a display by a first application and a rendering API. The method further comprises extracting the object from the first application via an engine and receiving a second user input by the processor. Responsive to second user input, the method comprises dragging, by the processor, the object on the display from the first window to a second application rendered in a second window and displaying, by the processor, the object in an intermediate space between the first window and the second window during the dragging. Responsive to the object crossing a focus border of the second window, the method comprises importing the object into the second application.

In an embodiment, selecting an object in accordance with the method comprises detouring, by the processor, the first user input to the engine, intercepting, by the processor, draw commands from the first application to the rendering API and determining, by the processor, the object from the draw commands of the first application. The method further comprises selecting, by the processor, the object and other objects in accordance with a selection algorithm. In an embodiment, the selection algorithm is configured to select all objects connected to the first object the ray hits. In an embodiment, the selection algorithm is configured to select all objects with a same object identifier as the first object the ray hits. In an embodiment, the selection algorithm is configured to select all objects with a same motion vector as the first object the ray hits. In an embodiment the selection algorithm is configured to select all objects with a same texture as the first object the ray hits.

In an embodiment, the first user input selecting an object is a cursor selection from a pointing device. In an embodiment, the first user input selecting an object comprises a user tracing a border around the object. In an embodiment, the first user input selecting an object comprises a selection tool that selects all contiguous pixels of a predetermined set of characteristics. In an embodiment, the first user input selecting an object is a tap on a touch interface. In an embodiment, the first user input selecting an object is a gesture on a touch interface.

In an embodiment, the method for determining, by the processor, the object comprises from the draw commands further comprises, assigning, by the processor, a camera on the near plane of a scene at the coordinates of the first user input and ray casting, by the processor, from the camera to a far plane and selecting the first object the ray hits. The method also comprises receiving, by the processor, further user input to expand or filter the selection wherein expanding or filtering the selection comprises selecting or deselecting, by the processor, other objects in a scene connected to the selected object or objects.

In an embodiment, the expanding or filtering the selection comprises, selecting or deselecting, by the processor, other objects in a scene with the same object identifier as the selected object or objects. In an embodiment, expanding or filtering the selection comprises selecting or deselecting, by the processor, other objects in a scene with the same motion vector as the selected object or objects. In an embodiment, expanding or filtering the selection comprises, selecting or deselecting, by the processor, other objects in a scene with a same texture as the selected object or objects. In an embodiment, expanding or filtering the selection comprises, selecting or deselecting, by the processor, other objects in a scene designated by the further user input. In an embodiment, the designation process comprises receiving, by the processor, a user input, assigning, by the processor, a camera on the near plane of the scene at the coordinates of the user input and ray casting, by the processor, from the camera to the far plane and designating the first object the ray hits.

In an embodiment, dragging the object on the display by the processor comprises, rendering, by the processor, a borderless window and a selection in the borderless window, wherein the selection comprises the object or objects selected by the user. In an embodiment, in response to receiving user input to drag the borderless window from the first window to the second window, the method comprises moving, by the processor, the borderless window across the display pursuant to the user inputs.

In an embodiment, the method for rendering, by the processor, the selection in the borderless window comprises, copying, by the processor, the draw commands associated with the selection from the first application, inserting, by the processor, the draw commands from the first application in the rendering API pipeline and rendering, by the processor, the draw commands via the rendering API.

In an embodiment, the method of importing the selection to a second application comprises, converting, by the processor, the selection for implementation into the second application and rendering, by the processor the selection via the engine in the second window during the conversion. In an embodiment, converting the selection comprises modifying, by the processor, the draw commands into a file format utilized by the second application. In an embodiment, the file format is an OBJ file.

Upon completion of the conversion, the method comprises, importing, by the processor, the selection into the second application. Upon importing the object into the second application, the method further comprises, halting, by the processor, the engine rendering process and rendering, by the processor, the object from within the second application.

In an embodiment, the method of rendering the selection via the engine comprises, inserting, by the processor, draw commands into a rendering API pipeline which is operable to instruct the rendering API to render the selection into the second window. In an embodiment, the second application has its own rendering API, and rendering the selection from within the second application comprises rendering, by the processor, the selection in the second window using the second application's rendering API.

In an embodiment, the method of rendering the selection in the borderless window comprises, obtaining, by the processor, first conditions, comprising lighting and environmental effects from the first application and second conditions, comprising lighting and environmental effects from the second application. The method also comprises gradually applying, by the processor, the first and second conditions depending on a distance of the borderless window from the first and second windows.

In an embodiment, a system for exporting and importing an object from a first application to a second application is disclosed. In an embodiment, the object is a three-dimensional object. The system comprises a graphics processing unit, a processor and a storage medium for tangibly storing thereon program logic for execution by the processor. In an embodiment, the storage medium can additionally comprise one or more of the first and second applications. The program logic in the storage medium comprises first user input receiving logic, executed by the processor, to receive a first user input. Selecting logic, comprised in the storage medium and executed by the processor selects an object rendered in a first window of a display by a first application and a rendering API in response to receiving the first user input The object is extracted from the first application by extracting logic comprised on the storage medium. In addition, the processor executes second user input receiving logic to receive a second user input, dragging logic to drag the object on the display from the first window to a second application rendered in a second window in response to receiving the second user input and in response to the object crossing the focus border of the second window, importing logic, comprised in the storage medium is executed by the processor, to import the object into the second application.

In an embodiment, the selecting logic executed by the processor, to select an object further comprises detouring logic which is also executed by the processor, to detour the first user inputs from the first application. In addition, the selecting logic comprises intercepting logic executed by the processor, to intercept the draw commands from the first application to the rendering API, determining logic executed by the processor, to determine the object from the draw commands associated with the first user input and selecting logic, executed by the processor, to select the three dimensional object and other objects in accordance with a selection algorithm.

In an embodiment, the determining logic further comprises, assigning logic, executed by the processor, to assign a camera on the near plane of the scene at the coordinates of the first user input. The determining logic executed by the processor also comprises ray casting logic, for ray casting from the camera to the far plane and selecting the first object the ray hits.

In an embodiment, the dragging logic executed by the processor comprises window rendering logic, to render a borderless window, selection rendering logic, to render a selection in the borderless window, wherein the selection comprises the object or objects selected by the user and moving logic, to move the borderless window across the display pursuant to the user inputs in response to receiving user inputs to drag the borderless window from the first window to the second window.

In an embodiment, the selection rendering logic executed by the processor further comprises copying logic, to copy the draw commands associated with the selection, inserting logic, to insert the draw commands in the rendering API pipeline and draw commands rendering logic, to render the draw commands via the rendering API. In an embodiment, the selection rendering logic further comprises first condition obtaining logic and second condition obtaining logic, executed by the processor, to obtain first conditions, comprising the lighting and environmental effects from the first application and second conditions, comprising the lighting and environmental effects from the second application. In addition, the selection rendering logic executed by the processor, comprises conditions applying logic, to gradually apply the first and second conditions depending on the distance of the windowless border from the first and second windows.

In an embodiment, the importing logic executed by the processor further comprises converting logic, for converting the selection for implementation into the second application such that the selection is imported into the second application upon completion of the conversion process, rendering logic for rendering the selection in the second window during the conversion process and halting logic, for halting the engine rendering process and rendering the object from within the second application upon importing the object into the second application. In an embodiment, the converting logic executed by the processor for the conversion process further comprises modifying logic to modify the draw commands into a file format utilized by the second application. In an embodiment, the file format is an OBJ file. In an embodiment, the rendering logic further comprises inserting logic, executed by the processor, to insert draw commands into a rendering API pipeline operable to instruct the rendering API to render the selection into the second window. In an embodiment, second application rendering API render the selection in the second window upon importing the object into the second application.

A computer readable storage medium, having stored thereon, instructions which when executed by a processor, cause the processor to receive a first user input and responsive to the first user input, select an object rendered in a first window of a display by a first application and a rendering API. The instructions further cause the processor to extract the object from the first application via an engine. In addition, the storage medium comprises instructions to receive a second user input and to drag, the object on the display from the first window to a second application rendered in a second window responsive to the second user input. The storage medium further comprises instructions to import the object into the second application responsive to the object crossing a focus border of the second window, import the object into the second application.

These and other embodiments whose features can be combined will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
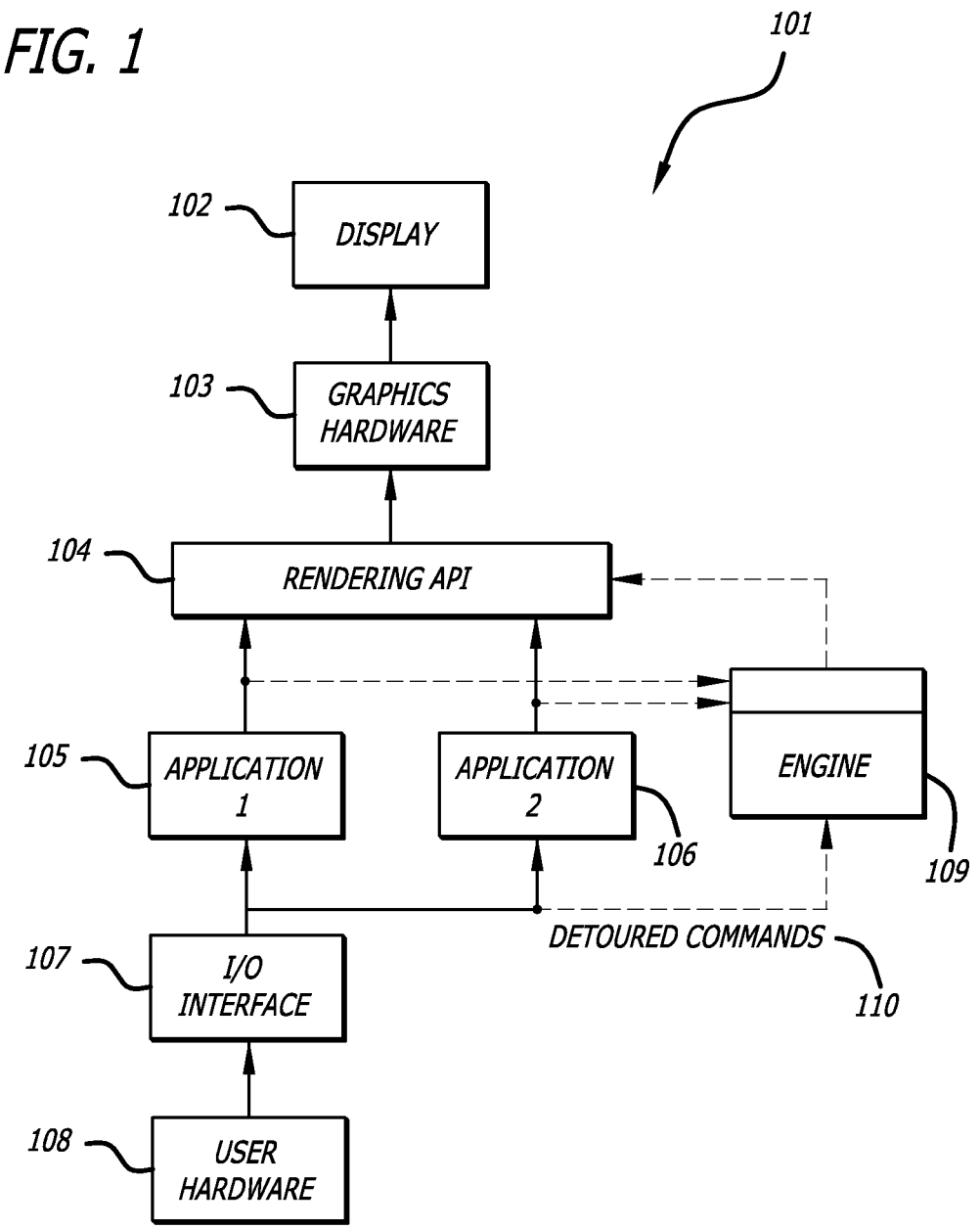
FIG. 1 illustrates an example of a computer system hosting two local applications and exporting a 3D object from a first application for importation into a second application.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks. Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure generally relates to exporting an object from a first 3D program for rendering in a second 3D program in real-time. In one embodiment, a computer system hosts a plurality of application instances, each application instance corresponding to a local client application. The computer system concurrently renders, utilizing the resources of the graphics processing unit of the computer system, the graphical output of the application instances corresponding to the at least two of the local client applications in separate windows on the computer system display. A user seeking to export a 3D object from the first application selects an object from the first window and drags the object to the second window. As the user drags the object, it is rendered on the computer display pursuant to the user's drag commands. The user then drops the object in the second application rendered in the second window, and the object is imported in real-time into the second application.

Rendering may be considered as the process of generating an image from a model, usually by means of computer programs. The model is usually a description of three-dimensional (3D) objects and may be represented in a strictly defined language or data structure. The model may contain geometry, viewpoint, texture, lighting, shading, motion, and other suitable types of information. The image into which the model is rendered may be a digital image or a raster graphics image, which may be formed by a collection of pixels. The present disclosure expands the concept of rendering to generating an image that represents any output of any application. The rendering may be performed based on any data, including two-dimensional (2D) data as well as 3D data. In addition to generating images based on 3D models, particular embodiments may render images that represent the output of applications such as, for example and without limitation, web browsing applications, word processing applications, spread sheet applications, multimedia applications, scientific and medical applications, and game applications.

Modifying an object from a 3D program is typically an arduous, if not impossible, task. If the user does not have the original OBJ or other format file for modifying in a 3D graphics program such as 3D Studio Max or Maya, the user must decompile the 3D graphics file used by the first 3D program. The graphics file may be stored in a given directory within the program's install path, or compiled into the actual program code itself. In any case, the user must perform several steps to obtain the object file in a format that is readable by a 3D graphics program. Similarly, after modifying the object file, in order to view the appearance of the 3D object from within the first program, the user must recompile or import the object into the code of the first program. This process is time-consuming, and is exacerbated by the use of remote applications.

Rendering may be a type of task that is suitable to be performed by a server because the rendering process is often resource demanding, as it may be very computational intensive, especially when the rendered images are of high resolution and high quality. In the past, it could have taken an older computer system hours or days to render a three-dimensional model into a single 2D image. With the development and advancement of computer hardware, especially computer hardware specifically designed for computer graphics applications (e.g., gaming, multimedia, entertainment, or mapping), present computer systems may be able to render each image within seconds or milliseconds. In fact, often it does not take all the available resources of a server to render a model into a single image. As such, remote applications using server-side rendering have become more prevalent.

To better facilitate the export of a 3D object from a first 3D program for importation into a second 3D program, a software engine may respond to user commands to select a particular object by intercepting the draw commands from the first application to the 3D graphics rendering pipeline, and insert them in the draw commands for a given scene from a second application. In particular embodiments, the second application may be a remote application hosted on a separate server. In other embodiments, the second application may be a remote application with server side rendering.

FIG. 1 illustrates an example computing system 101 running local first application 105 and local second application 106. In normal operation, user activates the system 101, for example, via manipulating user hardware 108, and I/O interface 107 translates the signals from the user/hardware 108 into instructions to either first application 105 or second application 106. Both applications 105 and 106 output draw commands to rendering API 104 for rendering 2D or 3D scenes. The rendering API 104 passes the draw commands through a rendering pipeline (not shown) to convert the draw commands into instructions executed by graphics hardware 103 to render the 2D or 3D scene on display 102. In one embodiment, the first application 105 is rendered in a first window on a portion of display 102, and the second application 106 is rendered in a second window on a different portion of display 102. In an embodiment, engine 109 is a software routine running on a processor (not shown) comprised within system 101 concurrently with first application 105 and second application 106. The engine 109 constantly monitors I/O interface 107 for instructions initiating the drag and drop process. When these instructions are detected, the instructions are detoured via path 110 to the engine 109. The user may initiate the drag and drop process in a variety of methods, including but not limited to: a special keystroke, holding a predetermined key in conjunction with a mouse or other pointing device input, a tap on a touch input device, or a specific gesture on a touch input device. Once the commands are detoured to the Engine 109 via path 110, the engine 109 allows the user to select a given object in any application window. Engine 109 also monitors the draw commands from first application 105 and second application 106 to the rendering API 104, and uses detoured user inputs 110 to determine which object or objects in a scene the user wishes to select. The engine 109 extracts the draw commands corresponding to the object or objects the user wishes to select, and passes them to the rendering API 104 for rendering during the drag process. During the drop process, the engine 109 continues to pass the draw commands for the object or objects to the rendering API 104 for rendering in the second application 106's window, but simultaneously converts the draw commands into a format for importing into the second application 106. Upon completion of the conversion and importation process, the engine 109 stops sending draw commands to the rendering API 104, and the selected object or objects are rendered exclusively through the second application 106. A more detailed explanation of the grab, drag, and drop processes is provided below. Only two applications are illustrated in FIG. 1 in order to simplify the discussion. However, it may be appreciated that in practice, the computing system 101 can concurrently execute any number of applications rendering various objects which can be exported from one application to another in accordance with embodiments described herein.

Figure 2:
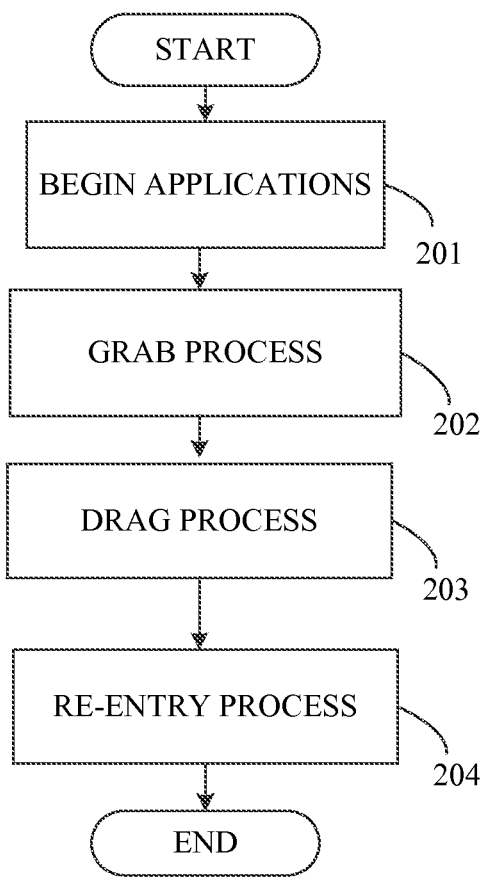
FIG. 2 illustrates the overall flow of the exportation and importation process, consisting of grabbing the object from the first application, dragging the object from the first to the second application, and dropping the object into the second application for rendering.

FIG. 2 illustrates a high level flow of the drag and drop process. At step 201, the computing system begins running multiple applications. At step 202, the user initiates the grab process, described in detail in FIG. 4. At step 203, the user drags the desired object from the window displaying the first application to the window displaying the second object, described in detail in FIG. 5. Finally, at step 204, the user drops the object into the window for the second application, also referred to as the re-entry process, further described in detail in FIG. 6.

Figure 3:
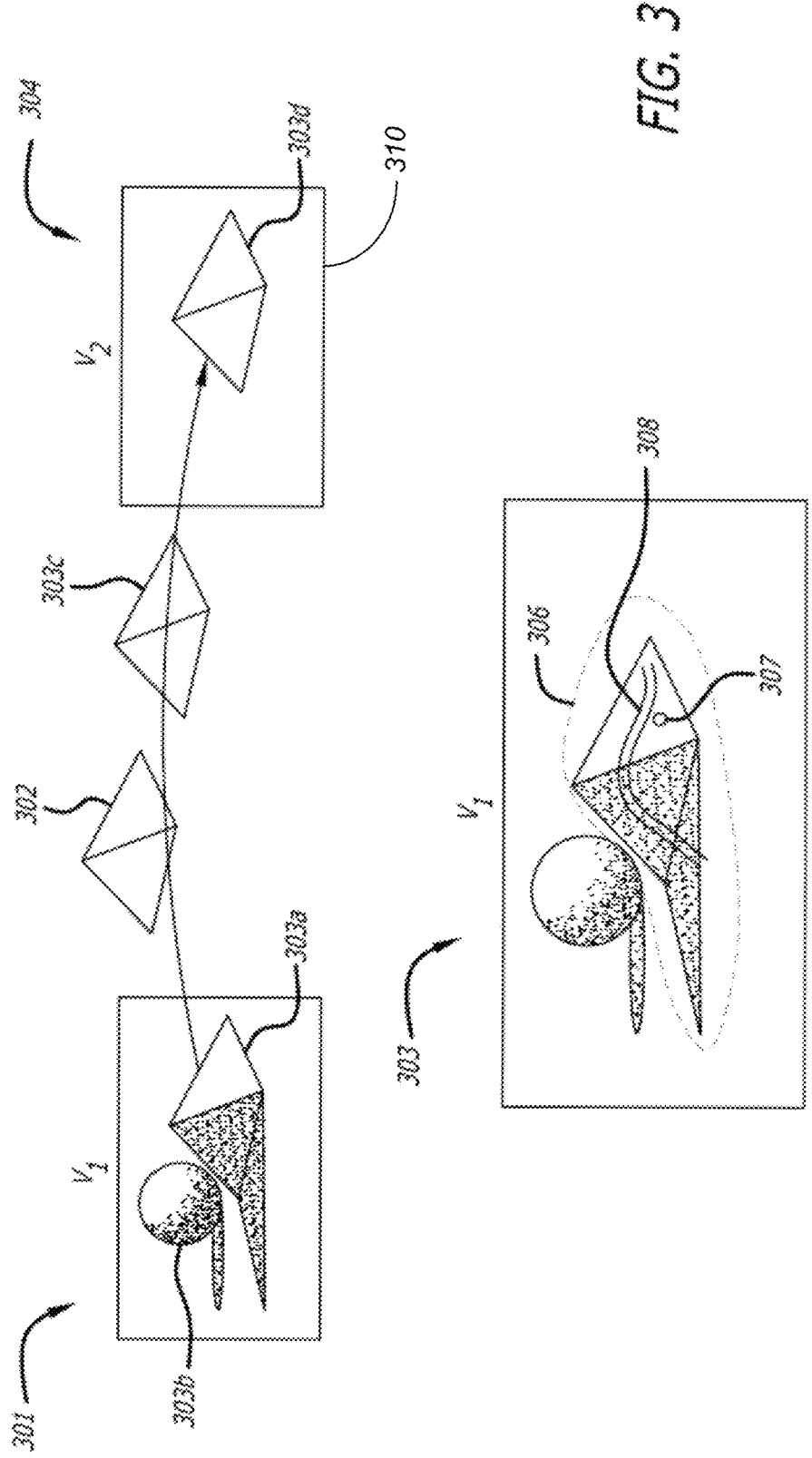
FIG. 3 illustrates the flow of the grab process.

FIG. 3 illustrates a representation of a user's display during the drag and drop process. Initially, the display of the computing system contains two separate windows, a first window 301 containing the rendered output of the first application, and a second window containing the rendered output of the second application 304. Rendered within first window 301 are objects 303*a* and 303*b*. In practice, first window 301 and second window 304 may contain any number of objects FIG. 3 is limited to two objects for the purposes of discussion only.

The first window 301 is shown in an enlarged view in FIG. 3 as 303. The user selects object 303*a* in a variety of different methods, such as clicking with an input device or tapping a touch screen a single point 307 on object 303*a*, tracing a path 308 with an in put device or on a touch screen through the object 303*a*, or drawing a marquee 306 around the object 303*a* with an input device or on a touch device. Other input methods, including but not limited to: gestures, selection wands, and polygonal marquees, can easily be envisioned by one possessing ordinary skill in the art.

Upon selecting object 303*a*, user drags the object on the display along path 302 from the first window 301 to the second window 304. In some embodiments, the object is copied, and remains rendered in window 301 while a copy 303*c* is rendered along the path 302 in an intermediate space extending between the first window 301 and the second window 304. In other embodiments, the actual object 303*a* is moved from window 301 to window 304. The path 302 is determined by user inputs and can take any path to or from window 301 to window 304.

Upon crossing the focus border 310 for second window 304, the engine initiates the re-entry, or drop, process. When the user has positioned object 303*a* as he or she desires in window 304, the user initiates a command to drop the object 303*a* into window 304. At that point, the drag and drop process is complete and the engine imports the object 303*a* as object 303*d* into the second application for rendering in the second window 304.

Figure 4:
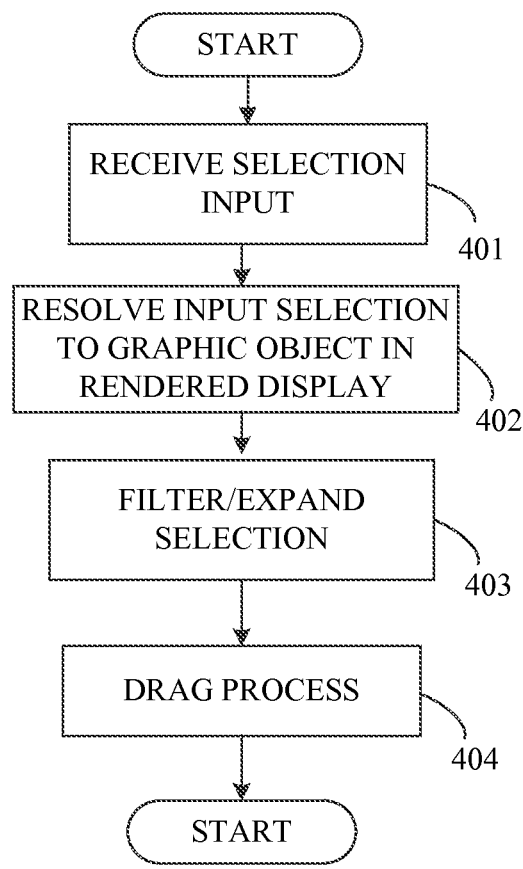
FIG. 4 illustrates the flow of the drag process.

FIG. 4 depicts the process flow of the grab process. At 401, the engine receives a selection input selecting the desired object. The invention envisions multiple selection input methods, as described above. Upon receiving the selection input, the engine detours the draw commands from the first application destined for the rendering API to the engine itself. From these draw commands, the engine is capable of re-creating the scene rendered by the first application. In the context of a 3D scene, the engine now has all the 3D objects in a given scene, as well as the camera point and field of view used by the first application to render the scene.

In one embodiment, the user input is a single point on the first window on the desired object. At step 402, the engine resolves the input selection to a graphic object in the rendered display. In order to translate this two-dimensional input to a three-dimensional object, traditional methods of 3D object selection are employed. One such method of is to assign a camera on the near plane of the 3D scene at the location of the user input, and ray cast from the camera to the far plane, selecting the first object that the ray hits. In another embodiment, a selection tool selects all objects touching the first object the ray hits. In another embodiment, a selection tool selects all the objects with the same object identifier, such as a tag or other meta-data, as the first object the ray hits. In another embodiment, a selection tool selects all the objects with the same texture as the first object the ray hits. In yet another embodiment, a selection tool selects all the objects with the same motion vector as the first object the ray hits.

At step 403, the engine filters or expands the user selection based upon user inputs. The user may choose to increase the selected object in the same way the original object was selected, or some other input method, such as holding down a modifier to add to the selection and drawing a marquee around other objects to be selected. Similarly, the user may be presented with a pop up window to select other objects with the same motion vector, texture, meta-data, etc. Similarly, the user may filter out objects from the selection in an analogous manner. The user may have a key for subtracting objects from a selection and click individual objects or draw a marquee around objects to be excluded from the selection. Additionally, the user may be provided a drop down menu to filter out objects with a given texture, motion vector, meta-data tag, etc. The invention envisions multiple methods of adding to or subtracting from a selection that are known to one of ordinary skill in the art.

After the user is satisfied, the user inputs commands to initiate the drag process at step 404. The commands may include but are not limited to: holding down the button of an input device in conjunction with moving the input device to drag the selected object, a specific gesture on a touch input device, holding down a key on the keyboard in conjunction with moving the input device, and the like. The invention envisions multiple methods of initiating the drag process 404.

Figure 5:
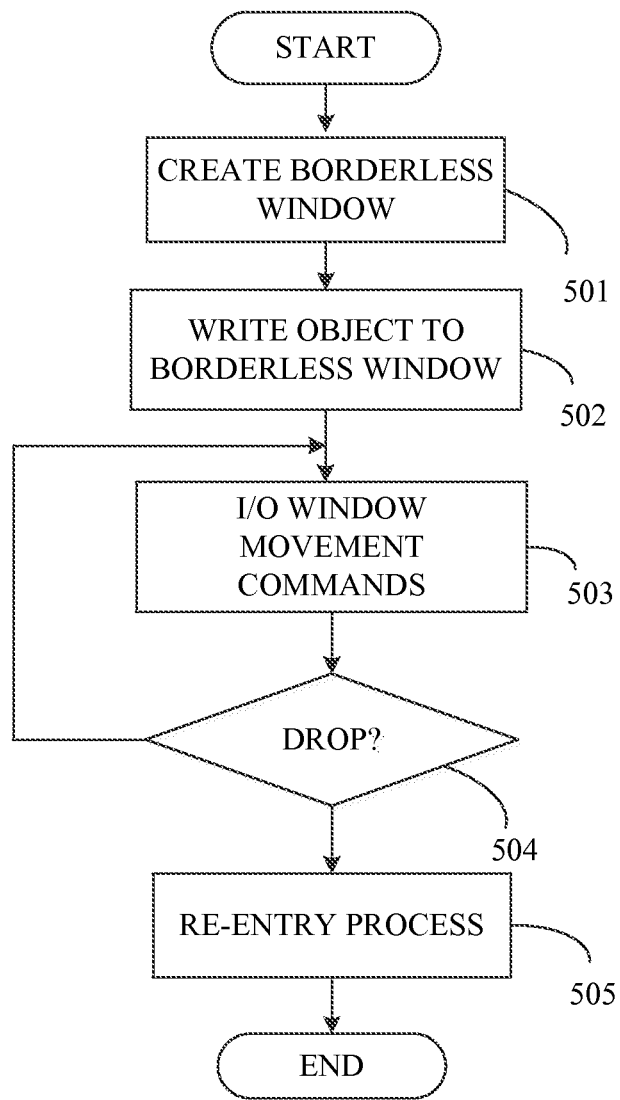
FIG. 5 illustrates the flow of the drop process.

FIG. 5 illustrates the process flow of the drag process. At 501, the engine creates a window on the computing system display. In an embodiment, the window can have a visible border. In an embodiment, the window is borderless. A borderless window is merely a designated area on the second display that is completely transparent, the only objects actually rendered on the display are the graphic objects contained within the borderless window. At step 502, the engine writes the object to the borderless window. The engine performs this step by detouring the draw commands associated with the selection from the first application to the engine. The engine then sends these draw commands to the rendering API as objects to be rendered within the borderless window. The rendering API processes the draw commands through the rendering pipeline as normal and renders the scene on the display within the borderless window. Because the borderless window is transparent, only the object appears to move from the first window to the second window. Thus during the drag process, the rendering API is processing draw commands from at least two applications in addition to the engine.

The engine transmits the draw commands associated with the selected object or objects in accordance to borderless window movement commands received from the user through input output interface 107. As stated, the disclosure envisions multiple input methods for the user to adjust the position of the borderless window during the drag process.

At any time the engine is not receiving user commands to move the borderless window, the engine polls for a user input command to determine if a drop command has been issued at step 504. The detection of a drop command sends the process to the re-entry process in step 505. Drop commands may be any command from user input equipment to indicate the user wishes to import the object into the second application rendered in the second window. Drop commands may comprise but are not limited to, releasing a held button on a mouse or other input device, a gesture on a touch input device, or other key press on an input device. Other user input methods for the drop commands may be envisioned by one of ordinary skill in the art. In one embodiment, the re-entry process begins as soon as the object is dragged past the focus border of the second window.

Figure 6:
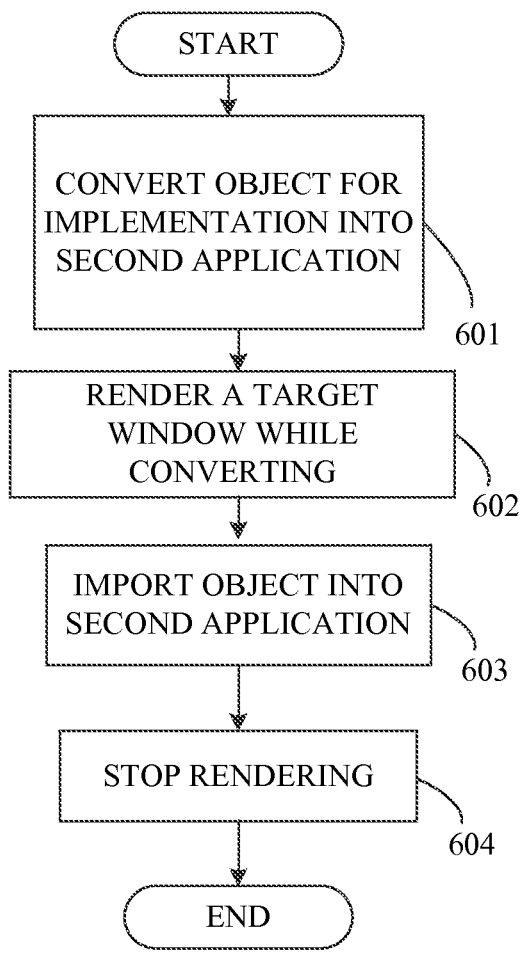
FIG. 6 illustrates the process flow of the re-entry process.

FIG. 6 illustrates the process flow of the re-entry process. At 601, the re-entry process begins. The re-entry process may be triggered by either an explicit drop instruction from the user, or the act of dragging the selection across the focus border of the second window. When the re-entry process begins, the engine begins to convert the object from draw commands into a format for implementation into the second application. In the 3D context, the engine begins converting the draw commands into a 3D object file for importation into the second application. For example, a user might be running a 3D game application in a first window and a 3D graphics editing program in the second window for editing a given model. After selecting the desired object, the user drags the object to the second window, and the re-entry process begins converting the draw commands associated with the object into a 3D object file such as an OBJ file.

At step 602, the engine continues to render the object by passing the draw commands associated with the object to the rendering API. Because the conversion process is time consuming and processor intensive, the engine continues to render the object while the conversion is taking place. The engine renders the object by inserting draw commands into the draw command stream from the second application to the rendering API. Thus during re-entry, the engine is not merely rendering the object in the borderless window overlaid on top of the second window, but actually integrating the object into the second application as if it were imported and rendered by the second application itself, including environmental effects. A detailed illustration of this feature is provided in FIG. 7.

At step 603, the conversion is completed and the object file is imported into the second application. The importing process differs for each application and each file format. In the context of a 3D graphics editing program, the file is imported into the workspace of the program as if the user had opened the file directly from the 3D graphics editing program. At step 604, after successful importation of the object into the second program, the engine halts its rendering of the object, and the object is rendered by the second application. The entire re-entry process occurs seamlessly, without any indication of multiple rendering processes or a file conversion to the user. The user is unaware of these background processes by the engine, and the object is rendered as if the object were simply dragged from the first window and dropped in the second window.

Figure 7:
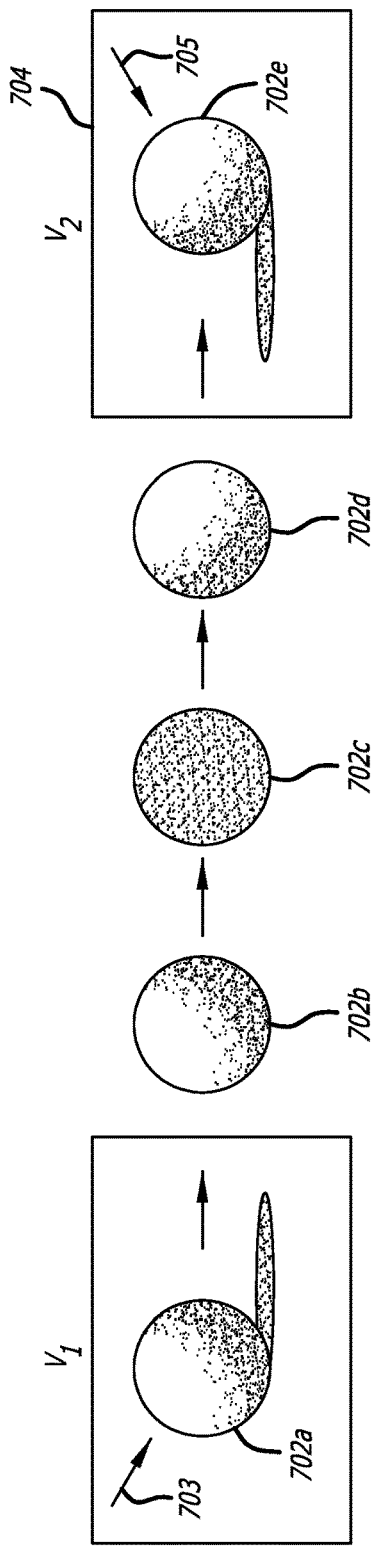
FIG. 7 illustrates a representation of the computer system display executing the process integrating environment effect rendering.

FIG. 7 depicts a representation of the drag and drop process integrating environmental effects. In the first window 701, an object 702*a*, shown for simplicity as a sphere sits with a light source 703 from the upper left of window 701. In the second window 704, the environment of the 3D scene includes a light source 705 from the upper right. During the grab process, the engine obtains the environment effects and lighting of both windows 701 and 704, and adaptively applies the environmental effects and lighting to the selected object 702*a* depending on the distance of the object from each window. Thus, as the object 702*a* is dragged towards the second window, the shading of the object 702*a* changes depending on the distance from the light sources 703 and 705, as shown by representations 702*b*, 702*c*, 702*d*, and 702*e*. The engine renders these environmental effects by applying them to the draw commands for the object before passing them to the rendering API. Environmental effects are not limited to merely lighting, but, as one skilled in the art can envision, can apply to fog, smoke, blurring, particle effects, reflections, and other well-known environmental effects.

Figure 8:
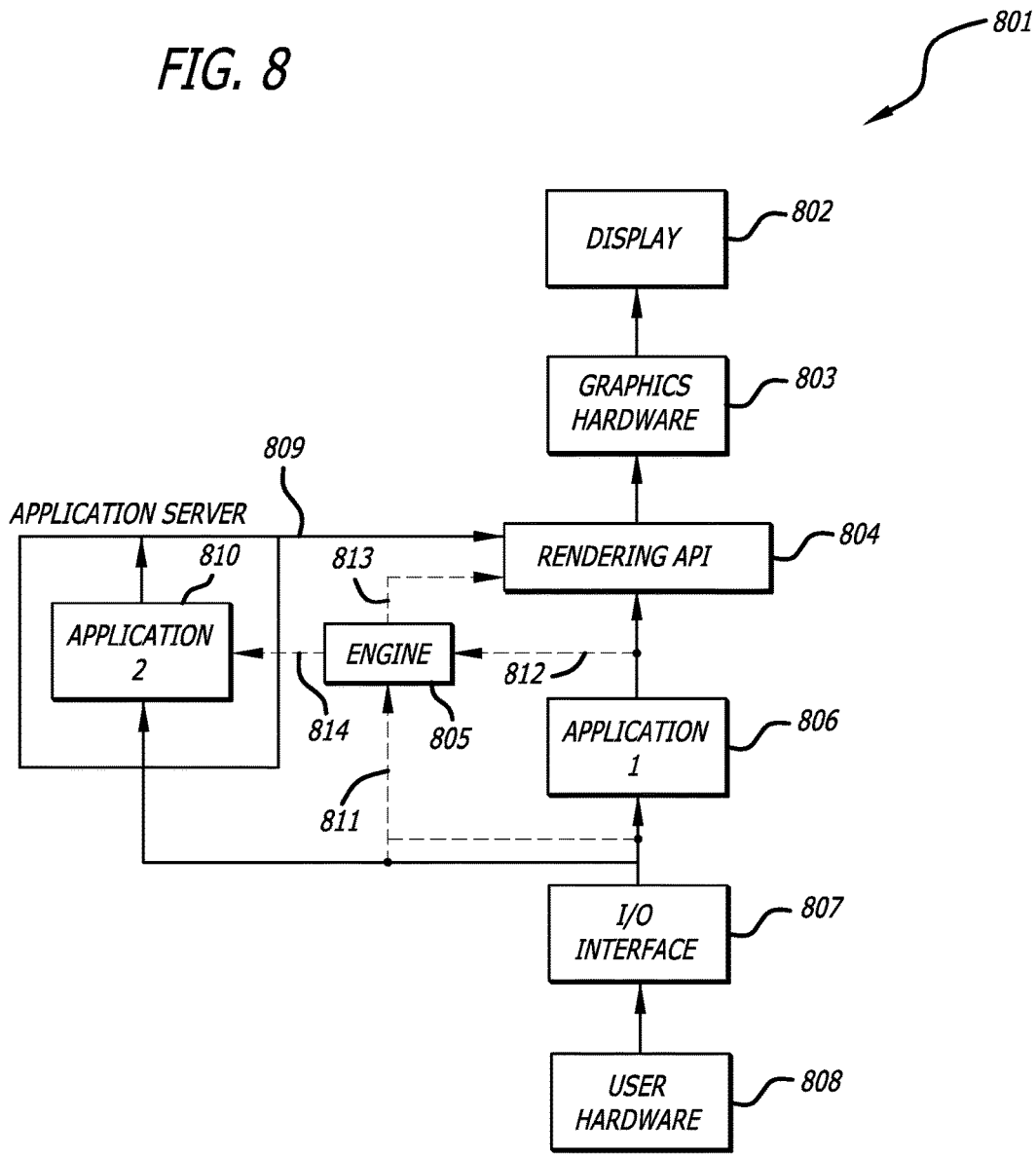
FIG. 8 illustrates an example of a computer system hosting a local application and an application server hosting a remote second application.

FIG. 8 depicts an embodiment of a computing system 801 wherein one of the two applications is a remote application 810 running on an application server 809. In such a case, the operation of the engine 805 does not vary. The engine intercepts instructions from the I/O interface 807 and detours the instructions to the engine along path 811 during the operation of the drag and drop process. Assuming the user is dragging from the local application 806 and dropping to the remote application 810, draw commands from the local application 806 to the rendering API 804 are intercepted and used during the grab process for the user to select the desired objects. During the drag process, the engine 805 handles the rendering of the object in the borderless window by detouring the draw commands for the selection to the rendering API 804. When the user drops the object into the window of the remote application 810, the engine 805 begins the conversion process while continuing to render the selected object. Upon completing the conversion, the converted object file is transferred over network link 814 to application server 809 for importation into remote application 810. After importation, the engine 805 ceases to pass draw commands to the rendering API 804 and the system operates as normal. In another embodiment, the user drags an object from a remote application to a locally hosted application. The system operates by a substantially similar mechanism in this arrangement.

Figure 9:
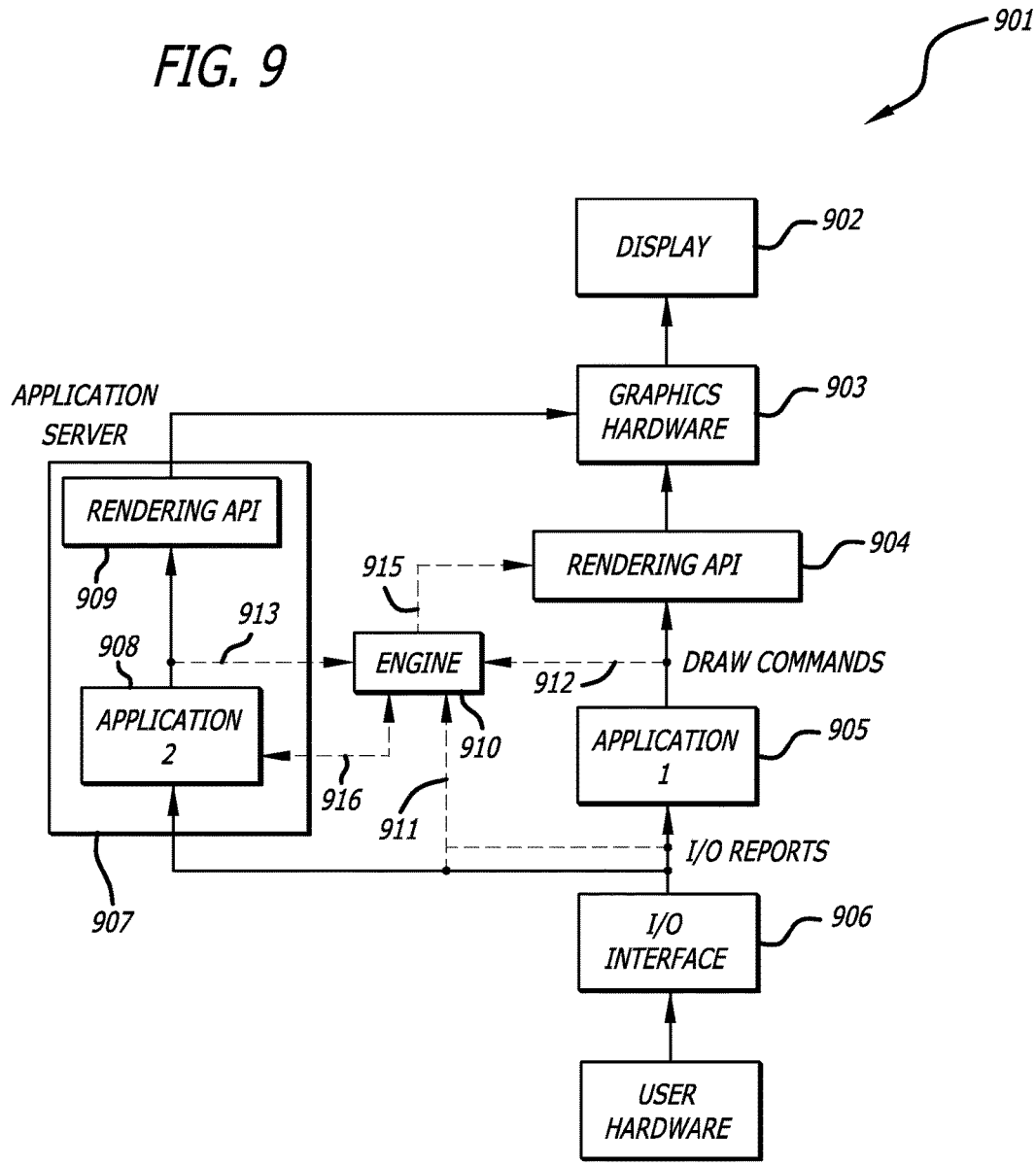
FIG. 9 illustrates an example of a computer system hosting a local application and an application server with server side rendering hosting a remote second application.

FIG. 9 depicts an embodiment of a computing system 901 wherein one of the applications 908 is a remote application run on application server 907 that has server-side rendering through its own rendering API 909. As an example, the user drags an application from the window of the local application 905 to the window of the remote rendered application 908. The operation of the system 901 is substantially the same as in FIG. 8. The engine 910 intercepts I/O inputs from I/O interface 906 and detours them along path 914 for the duration of the drag and drop process. During the grab process, the engine 910 detours draw commands from the local application 905 to destined for the local rendering API 904 to the engine. After the user selects the object, the engine 910 detours the commands to either the local rendering API 904 along path 915. During the drag process, the detoured draw commands for the selected object are rendered by the local rendering engine 910 to render the object in the borderless window. Upon initiation of the re-entry process, the engine begins file conversion of the object into an object file for importation into remote application 908. When the file is converted, the file is imported into the remote application 908 through path 916. Then the engine stops rendering the object through local rendering API 904, and the object is exclusively rendered through remote rendering API 909

A special case exists for the embodiment where a user wishes to select an object from a remote application with server-side rendering, such as application 908. In such an embodiment, the engine must have access to the output of remote application 908 before it enters the remote rendering API 909. This must be a special implementation requiring software residing on remote application server 907, or at a bare minimum, permission from the server 907 for engine 910 to monitor the path between the remote application 908 and rendering API 909. In such a case, the draw commands from application 908 are detoured over a network connection 913 to the engine 910. This special case only arises when grabbing objects from remote applications with server side rendering.

The disclosure envisions multiple arrangements, such as dragging from one remote application to another, or variations of copy/pasting an object from one application to multiple other applications. Such embodiments should be readily contemplated by those of ordinary skill in the art. Although the disclosure describes a single instance of dragging and dropping from a first application to a second application, skilled artisans in the art can envision dragging from a first application to a second application, editing the object, and dragging the edited object back into the first application to view the changes in real-time.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 10:
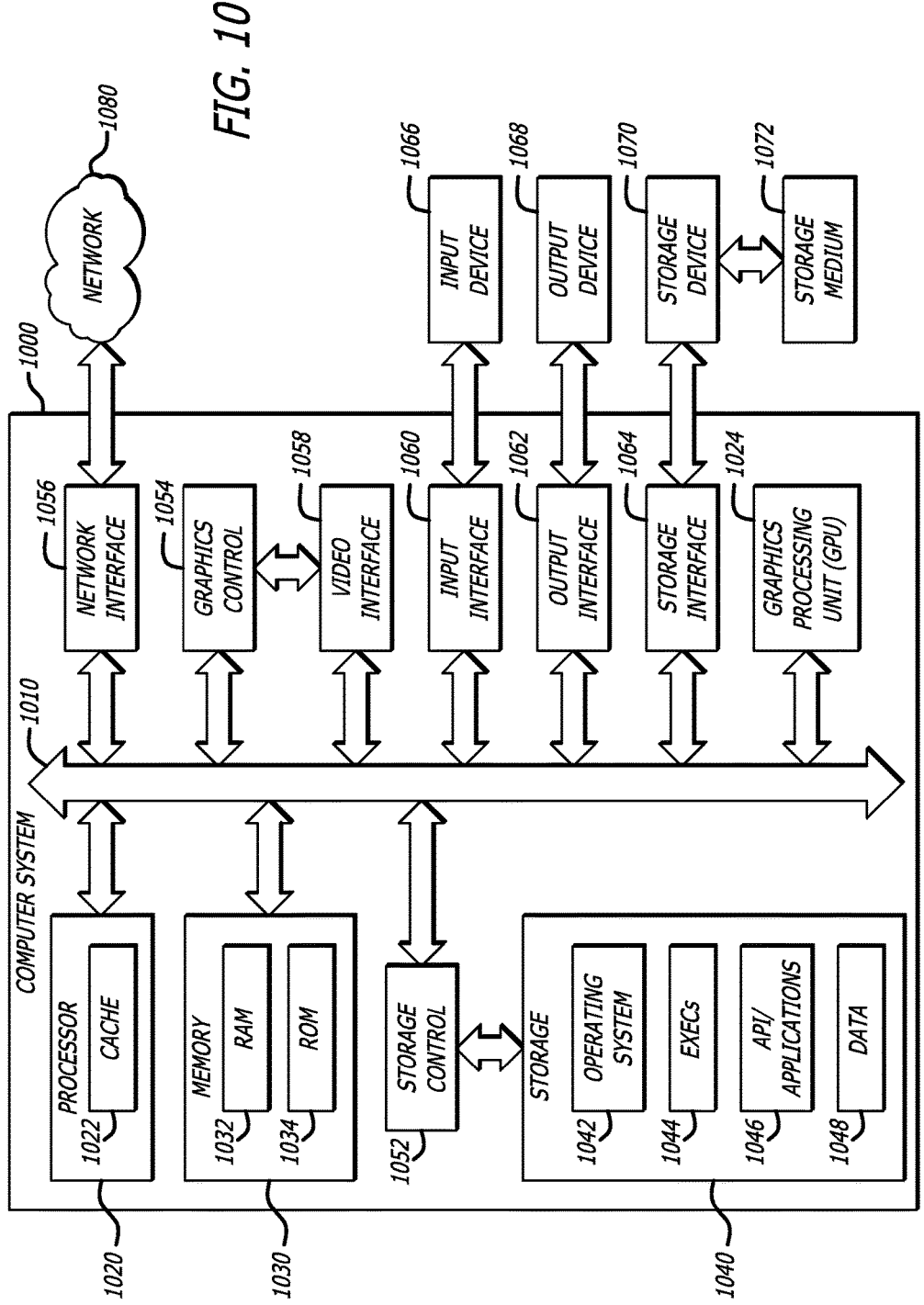
FIG. 10 illustrates an example computer system 1000 suitable for implementing one or more portions of particular embodiments.

For example, FIG. 10 illustrates an example computer system 1000 suitable for implementing one or more portions of particular embodiments. Although the present disclosure describes and illustrates a particular computer system 1000 having particular components in a particular configuration, the present disclosure contemplates any suitable computer system having any suitable components in any suitable configuration. Moreover, computer system 1000 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 1010 couples subsystems of computer system 1000 to each other. Herein, reference to a bus encompasses one or more digital signal lines serving a common function. The present disclosure contemplates any suitable system bus 1010 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 1000 includes one or more processors 1020 (or central processing units (CPUs)). A processor 1020 may contain a cache 1022 for temporary local storage of instructions, data, or computer addresses. Processors 1020 are coupled to one or more storage devices, including memory 1030. Memory 1030 may include random access memory (RAM) 1032 and read-only memory (ROM) 1034. Data and instructions may transfer bi-directionally between processors 1020 and RAM 1032. Data and instructions may transfer uni-directionally to processors 1020 from ROM 1034. RAM 1032 and ROM 1034 may include any suitable computer-readable storage media.

Computer system 1000 includes fixed storage 1040 coupled bi-directionally to processors 1020. Fixed storage 1040 may be coupled to processors 1020 via storage control unit 10102. Fixed storage 1040 may provide additional data storage capacity and may include any suitable computer-readable storage media. Fixed storage 1040 may store an operating system (OS) 1042, one or more executables 1044, one or more applications or programs 1046, data 1048, and the like. Fixed storage 1040 is typically a secondary storage medium (such as a hard disk) that is slower than primary storage. In appropriate cases, the information stored by fixed storage 1040 may be incorporated as virtual memory into memory 1030.

Processors 1020 may be coupled to a variety of interfaces, such as, for example, graphics control 10104, video interface 10108, input interface 1060, output interface 1062, and storage interface 1064, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 10106 may couple processors 1020 to another computer system or to network 1080. With network interface 10106, processors 1020 may receive or send information from or to network 1080 in the course of performing steps of particular embodiments. Particular embodiments may execute solely on processors 1020. Particular embodiments may execute on processors 1020 and on one or more remote processors operating together.

In a network environment, where computer system 1000 is connected to network 1080, computer system 1000 may communicate with other devices connected to network 1080. Computer system 1000 may communicate with network 1080 via network interface 10106. For example, computer system 1000 may receive information (such as a request or a response from another device) from network 1080 in the form of one or more incoming packets at network interface 10106 and memory 1030 may store the incoming packets for subsequent processing. Computer system 1000 may send information (such as a request or a response to another device) to network 1080 in the form of one or more outgoing packets from network interface 10106, which memory 1030 may store prior to being sent. Processors 1020 may access an incoming or outgoing packet in memory 1030 to process it, according to particular needs.

Computer system 1000 may have one or more input devices 1066 (which may include a keypad, keyboard, mouse, stylus, etc.), one or more output devices 1068 (which may include one or more displays, one or more speakers, one or more printers, etc.), one or more storage devices 1070, and one or more storage medium 1072. An input device 1066 may be external or internal to computer system 1000. An output device 1068 may be external or internal to computer system 1000. A storage device 1070 may be external or internal to computer system 1000. A storage medium 1072 may be external or internal to computer system 1000.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 1030 may include one or more computer-readable storage media embodying software and computer system 1000 may provide particular functionality described or illustrated herein as a result of processors 1020 executing the software. Memory 1030 may store and processors 1020 may execute the software. Memory 1030 may read the software from the computer-readable storage media in mass storage device 1030 embodying the software or from one or more other sources via network interface 10106. When executing the software, processors 1020 may perform one or more steps of one or more processes described or illustrated herein, which may include defining one or more data structures for storage in memory 1030 and modifying one or more of the data structures as directed by one or more portions the software, according to particular needs. In addition or as an alternative, computer system 1000 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In particular embodiments, computer system 1000 may include one or more Graphics Processing Units (GPUs) 1024. In particular embodiments, GPU 1024 may comprise one or more integrated circuits and/or processing cores that are directed to mathematical operations commonly used in graphics rendering. In some embodiments, the GPU 1024 may use a special graphics unit instruction set, while in other implementations, the GPU may use a CPU-like (e.g. a modified x86) instruction set. Graphics processing unit 1024 may implement a number of graphics primitive operations, such as blitting, texture mapping, pixel shading, frame buffering, and the like. In particular embodiments, GPU 1024 may be a graphics accelerator, a General Purpose GPU (GPGPU), or any other suitable processing unit.

In particular embodiments, GPU 1024 may be embodied in a graphics or display card that attaches to the hardware system architecture via a card slot. In other implementations, GPU 1024 may be integrated on the motherboard of computer system architecture. Suitable graphics processing units may include Advanced Micro Devices(r)AMD R7XX based GPU devices (RADEON(r) HD 4XXX), AMD R8XX based GPU devices (RADEON (r) HD 10XXX), Intel(r) Larabee based GPU devices (yet to be released), nVidia(r) 8 series GPUs, nVidia(r) 9 series GPUs, nVidia(r) 100 series GPUs, nVidia(r) 200 series GPUs, and any other DX11-capable GPUs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

What is claimed is:

1. A method comprising:
   receiving, by a processor, a first user input;
   responsive to the first user input, selecting, by the processor, an object rendered in a first window of a display by a first application and a rendering API (Application Programming Interface), wherein selecting an object comprises intercepting draw commands from the first application to the rendering API;
   extracting, by the processor, the object from the first application via an engine that monitors received user inputs;
   receiving, by the processor, a second user input for dragging the object on the display from the first window to a second application rendered in a second window;
   responsive to the second user input to drag the object from the first window to the second window:
     rendering, by the processor, a borderless window;
     rendering, by the processor, a selection in the borderless window by detouring the draw commands intercepted from the first application to the rendering API to the engine, wherein the selection comprises the object selected by the user; and
     moving, by the processor, the borderless window comprising the selection across the display from the first window to the second window pursuant to the second user input;
   importing, by the processor, in response to the selection in the borderless window crossing a focus border of the second window, the selection in the borderless window into the second application, the importing comprising inserting the intercepted draw commands into a rendering API pipeline operable to instruct the rendering API to render the selection in the second window, the rendering in the second window being in accordance with visual effects of the second application; and
   ceasing, by the processor upon importation, intercepting and detouring the draw commands from the first application to the rendering API.

2. The method of claim 1, wherein selecting an object further comprises:

detouring, by the processor, the first user input to the engine;

determining, by the processor, the object from the draw commands; and selecting, by the processor, the object and other objects in accordance with a selection algorithm.

3. The method of claim 2, wherein determining, by the processor, the object comprises:

assigning, by the processor, a camera on a near plane of a scene at coordinates of the first user input;

ray casting, by the processor, from the camera to a far plane; and selecting, by the processor, the first object the ray hits.

4. The method of claim 3, further comprising:

receiving, by the processor, further user input to expand or filter the selection.

5. The method of claim 4, wherein expanding or filtering the selection comprises:

selecting or deselecting, by the processor, other objects in a scene connected to the selected object or objects.

6. The method of claim 4, wherein expanding or filtering the selection comprises:

selecting or deselecting, by the processor, other objects in a scene designated by the further user input, wherein the designation process comprises:

receiving, by the processor, another user input for one of an object selection or deselection;

assigning, by the processor, another camera on the near plane of the scene at the coordinates of the other user input; and ray casting, by the processor, from the camera to the far plane and designating the first object the ray hits.

7. The method of claim 1, wherein rendering, by the processor, the selection in the borderless window comprises:

copying, by the processor, draw commands associated with the selection from the first application;

inserting, by the processor, the draw commands from the first application in a pipeline of a rendering API; and rendering, by the processor, the draw commands via the rendering API.

8. The method of claim 1, wherein rendering the selection in the borderless window comprises:

obtaining, by the processor, first conditions, comprising lighting and environmental effects from the first application;

obtaining, by the processor, second conditions, comprising lighting and environmental effects from the second application; and gradually applying, by the processor, the first and second conditions depending on a distance of the borderless window from the first and second windows.

9. The method of claim 1, wherein importing the selection to a second application comprises:

converting, by the processor, the selection for implementation into the second application;

rendering, by the processor, the selection via the engine in the second window during the conversion;

upon completion of the conversion, importing, by the processor, the selection into the second application; and upon importing the object into the second application, halting, by the processor, the engine rendering process and rendering, by the processor, the object from within the second application.

10. The method of claim 9, wherein converting the selection comprises:

modifying, by the processor, the draw commands into a file format utilized by the second application.

11. The method of claim 10, wherein the second application has its own rendering API, and rendering the selection from within the second application comprises rendering, by the processor, the selection in the second window using the second application's rendering API.

12. A system, comprising:

a graphics processing unit;

a processor; and a storage medium for tangibly storing thereon program logic for execution by the processor, the program logic comprising:

first user input receiving logic, executed by the processor, to receive a first user input;

selecting logic, executed by the processor to select an object rendered in a first window of a display by a first application and a rendering API in response to receiving the first user input;

extracting logic, executed by the processor, to extract the object from the first application via an engine that monitors received user inputs, wherein selecting an object comprises intercepting draw commands from the first application to the rendering API;

second user input receiving logic, executed by the processor, to receive a second user input;

dragging logic, executed by the processor, to drag the object on the display from the first window to a second application rendered in a second window in response to receiving the second user input, the dragging logic further comprising:

window rendering logic, executed by the processor to render a borderless window;

selection rendering logic, executed by the processor to render a selection in the borderless window by detouring the draw commands intercepted from the first application to the rendering API to the engine, wherein the selection comprises the object selected by the user; and moving logic, executed by the processor, to move the borderless window across the display from the first window to the second window pursuant to the second user input in response to receiving the second user input to drag the borderless window from the first window to the second window;

importing logic, executed by the processor, to import, in response to the selection in the borderless window crossing a focus border of the second window, the selection in the borderless window into the second application, the importing comprising inserting the intercepted draw commands into a rendering API pipeline operable to instruct the rendering API to render the selection in the second window, the rendering in the second window being in accordance with visual effects of the second application; and ceasing logic, executed by the processor, to cease, upon importation, intercepting and detouring the draw commands from the first application to the rendering API.

13. The system of claim 12, wherein the selecting logic executed by the processor, to select an object further comprises:

detouring logic, executed by the processor, to detour the first user input from the first application;

determining logic, executed by the processor, to determine the object from the draw commands associated with the first user input; and selecting logic, executed by the processor, to select the object and other objects in accordance with a selection algorithm.

14. The system of claim 12, wherein determining, by the processor, the object comprises:
assigning logic, executed by the processor, to assign a camera on a near plane of a scene at coordinates of the first user input; and
ray casting logic, executed by the processor, for ray casting from the camera to afar plane and selecting the first object the ray hits.

15. The system of claim 12, wherein the importing logic further comprises:
converting logic, executed by the processor, for converting the selection for implementation into the second application such that the selection is imported into the second application upon completion of the conversion;
rendering logic, executed by the processor, for rendering the selection in the second window during the conversion process; and
halting logic, executed by the processor, for halting the engine rendering process and rendering the object from within the second application upon importing the object into the second application.

16. The system of claim 12, wherein the selection rendering logic further comprises:
first condition obtaining logic, executed by the processor, to obtain first conditions, comprising lighting and environmental effects from the first application;
second condition obtaining logic, executed by the processor, to obtain second conditions, comprising lighting and environmental effects from the second application; and
conditions applying logic, executed by the processor, to gradually apply the first and second conditions depending on the distance of the borderless window from the first and second windows.

17. A non-transitory computer readable storage medium, having stored thereon, processor-executable instructions for:
receiving a first user input;
responsive to the first user input, selecting an object rendered in a first window of a display by a first application and a rendering API, wherein selecting an object comprises intercepting draw commands from the first application to the rendering API;
extracting the object from the first application via an engine;
receiving a second user input for dragging the 3D object on the display from the first window to a second application rendered in a second window;
responsive to the second user input:
rendering a borderless window;
rendering a selection in the borderless window by detouring the draw commands intercepted from the first application to the rendering API to the engine, wherein the selection comprises the object selected by the user; and
moving the borderless window comprising the selection across the display from the first window to the second window pursuant to the second user input;
importing, in response to the selection in the borderless window crossing a focus border of the second window, the selection in the borderless window into the second application, the importing comprising inserting the intercepted draw commands into a rendering API pipeline operable to instruct the rendering API to render the selection in the second window, the rendering in the second window being in accordance with visual effects of the second application; and
ceasing, upon importation, intercepting and detouring the draw commands from the first application to the rendering API.

18. The computer readable storage medium of claim 17, wherein instructions for importing the object into the second application further comprise instructions for:
receiving a user gesture for importing the object into the second application responsive to the borderless window comprising the object crossing a focus border of the second window.

* * * * *